US007182003B1

(12) United States Patent
Hsieh

(10) Patent No.: US 7,182,003 B1
(45) Date of Patent: Feb. 27, 2007

(54) PALM TYPE SPANNER

(76) Inventor: Chih-Ching Hsieh, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/230,618

(22) Filed: Sep. 21, 2005

(51) Int. Cl.
*B25B 23/16* (2006.01)
*B25G 1/02* (2006.01)
*B25B 1/00* (2006.01)
*F16B 23/00* (2006.01)
*F16B 35/06* (2006.01)

(52) U.S. Cl. .................. 81/177.6; 81/177.7; 81/177.8; 411/403

(58) Field of Classification Search ............... 81/177.6, 81/177.7, 177.8, 450, 461; 411/403, 910; 403/315, 316; 285/90, 404
See application file for complete search history.

(56) References Cited

U.S. PATENT DOCUMENTS 1,331,956 A * 2/1920 Cross ............................ 81/60
2,628,522 A * 2/1953 Kraft .......................... 81/125.1
5,279,189 A * 1/1994 Marino ....................... 81/177.8
D359,211 S * 6/1995 Knox et al. ..................... D8/25
5,542,322 A * 8/1996 Knox et al. ................ 81/177.6
5,943,924 A * 8/1999 Jarvis ......................... 81/177.2
6,167,787 B1 * 1/2001 Jarvis ......................... 81/177.2
6,341,927 B2 * 1/2002 Hampson et al. ........... 411/403
6,899,002 B2 * 5/2005 Willis, Sr. .................. 81/177.7

* cited by examiner

*Primary Examiner*—Lee D. Wilson
*Assistant Examiner*—Alvin J Grant

(57) ABSTRACT

A palm type spanner comprises a driving head having a receiving portion for receiving a driving tool; and a handle body being an integral plate-like structure; one end of the handle body being formed with an opening portion; the driving head being pivotally installed to the handle body; thereby the driving head being rotatable along the pivotal shaft; and the handle body having a hollowed groove which has a size capable of receiving the driving head.

3 Claims, 10 Drawing Sheets

PALM TYPE SPANNER

FIELD OF THE INVENTION

The present invention relates to spanners, and in particular to a palm type spanner, wherein the driving head can be received into a handle body so as to have a compact size. In use, the driving head can be expanded to have a larger size. Thereby the palm type spanner is easily carried.

BACKGROUND OF THE INVENTION

Spanners are tools which are generally used in manufacturing. However the spanner is a large tool so that it cannot be carried conveniently. Thereby there is a great demand for a novel design which can improve the prior art defect.

In one improvement, a driving unit has a receiving portion with a stop surface. A tool head is received in the driving unit. When it is desired to operate the tool, the head is pulled out from the receiving portion, but the stop surface will affect the operation of the tool head. Thereby the type of the tool head is fixed so that the use of the spanner is confined.

SUMMARY OF THE INVENTION

Accordingly, the primary object of the present invention is to provide a palm type spanner, wherein the driving head can be received into a handle body so as to have a compact size. In use, the driving head can be pulled out to have a larger size. Thereby the palm type spanner is easily carried.

To achieve above objects, the present invention provides a palm type spanner which comprises a driving head having a receiving portion for receiving a driving tool; and a handle body being an integral plate-like structure; one end of the handle body being formed with an opening portion; the driving head being pivotally installed to the handle body; thereby the driving head being rotatable along the pivotal shaft; the handle body having a hollowed groove which has a size capable of receiving the driving head.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
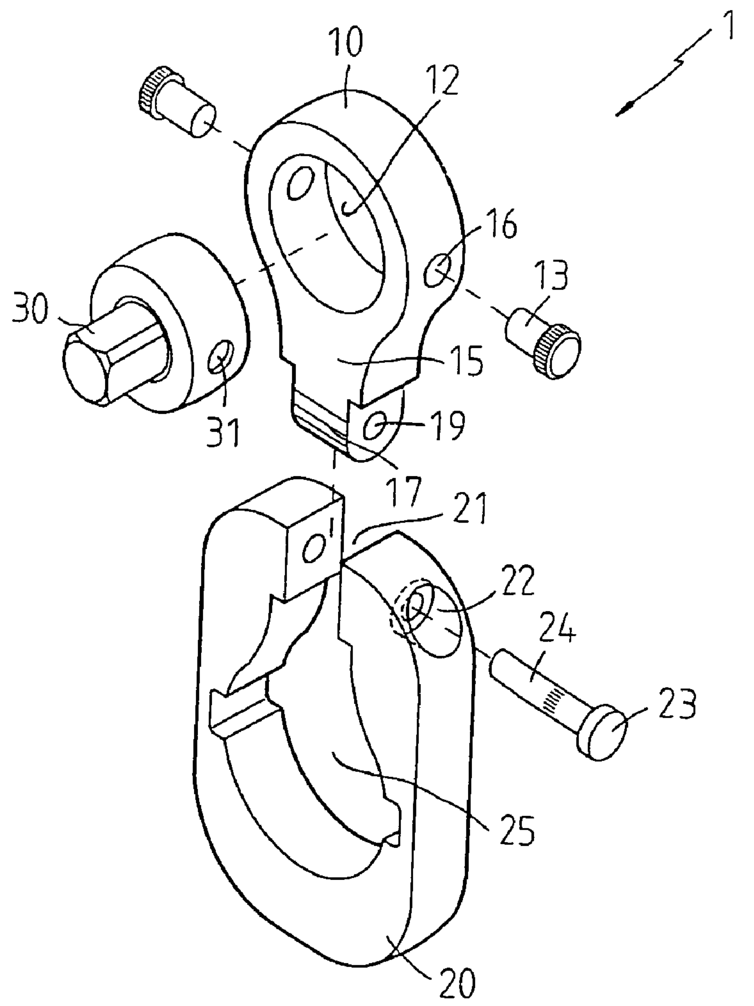
FIG. 1 is a structural exploded perspective view of the present invention.

With reference to FIG. 1, the palm type spanner of the present invention is illustrated. The palm type spanner 1 has the following elements.

A driving head 10 has a receiving portion 12 for receiving a driving tool 30. Two lateral sides of the driving head 10 aside the receiving portion 12 are formed with retaining holes 16 for retaining positioning elements 13. The driving head 10 has an extension portion 15 which is connected to a neck portion 17 of the driving head 10. The neck portion 17 has an axial hole 19.

A handle body 20 is an integral plate-like structure. One end of the handle body 20 is formed with an opening portion 21. Two sides of the opening portion 21 are formed with respective combining holes 22. A pivotal shaft 23 passes through the two combining holes 22 and the axial hole 19 of the driving head 10 so as to pivotally install the handle body 20 to the driving head 10. Thereby the driving head 10 is rotatable along the pivotal shaft 23. The pivotal shaft 23 is formed with a resisting portion 24 for resisting an object to be retained in a desire orientation. The handle body 20 has a hollowed groove 25 having a shape corresponding to that of the driving head 10 for receiving the driving head 10.

A driving tool 30 can be assembled into the receiving portion 12 of the driving head 10. Two sides of the driving tool 30 have respective recesses 31 corresponding to the retaining holes 16 of the receiving portion 12. When the driving tool 30 is assembled to the driving head 10, the positioning element 13 passes through the retaining holes 16 to insert into the recess 31 so as to fix the driving tool 30.

Referring to FIGS. 5 to 9, another embodiment of the present invention is illustrated. In this and following embodiments, those identical to above mentioned structure will not be further described herein. Only those different are described. The driving head 10 has a U shape opening 18, referring FIG. 5. The driving tool 30 is retained to the U shape opening 18.

Figure 2:
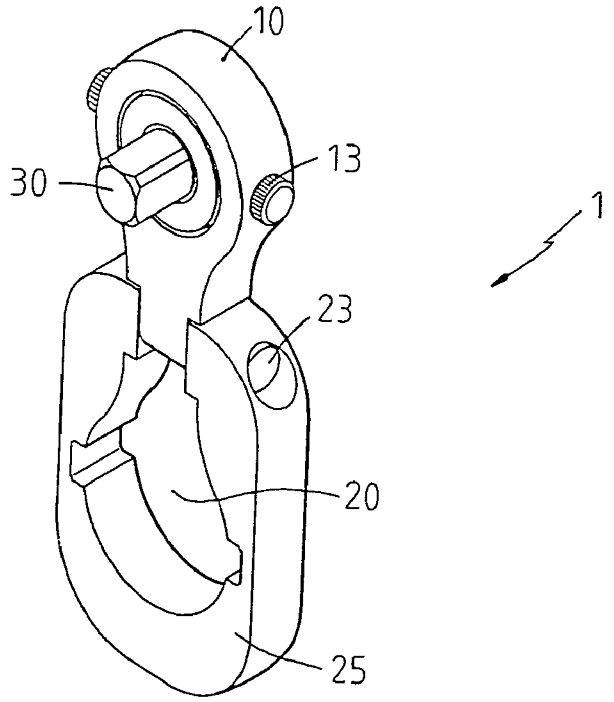
FIG. 2 is an assembled view of the palm type spanner of the present invention.
Figure 3:
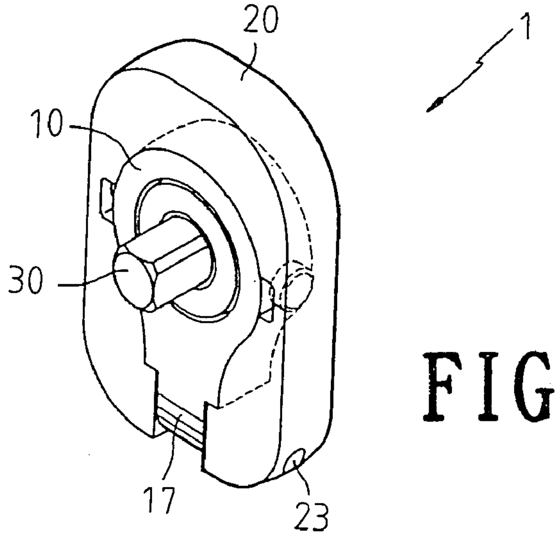
FIG. 3 is an assembled view of the present invention, wherein the palm type spanner is folded.
Figure 4A:
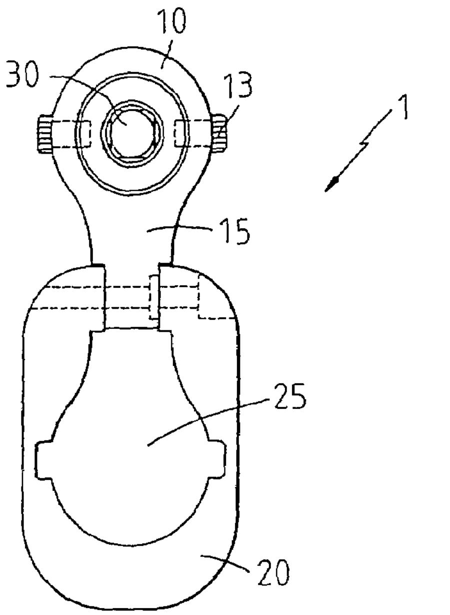
FIGS. 4*a* to 4*d* show different assembled view of a palm type spanner of the present invention.
Figure 4B:
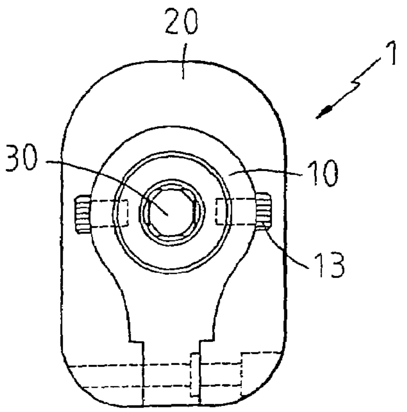
Figure 4C:
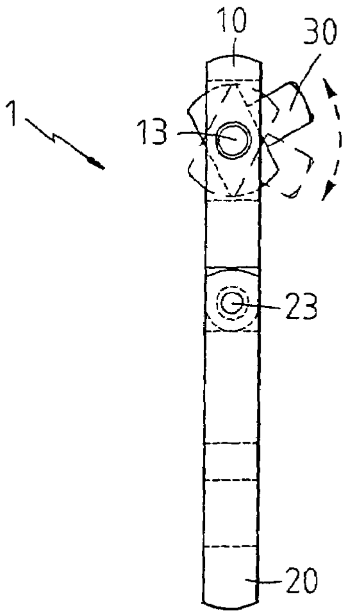
Figure 4D:
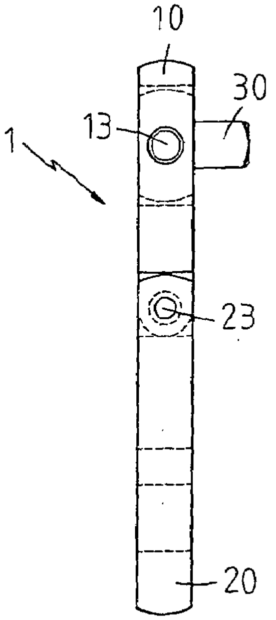
Figure 5:
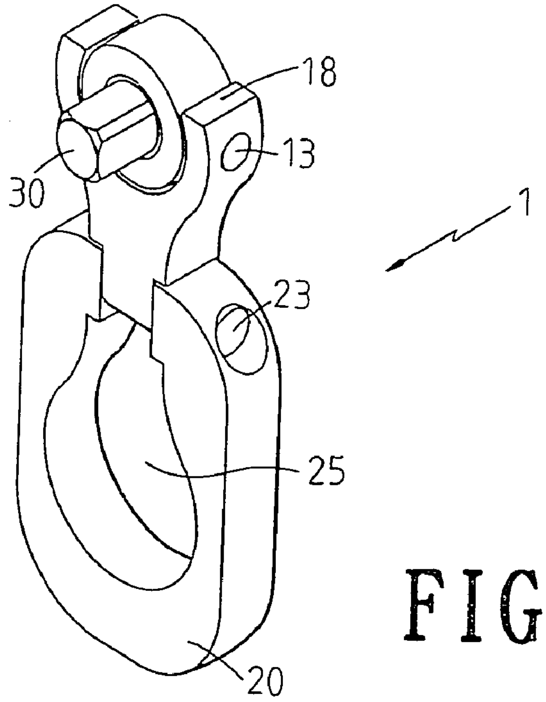
FIG. 5 is an assembled perspective view of the palm type spanner of the present invention.
Figure 6:
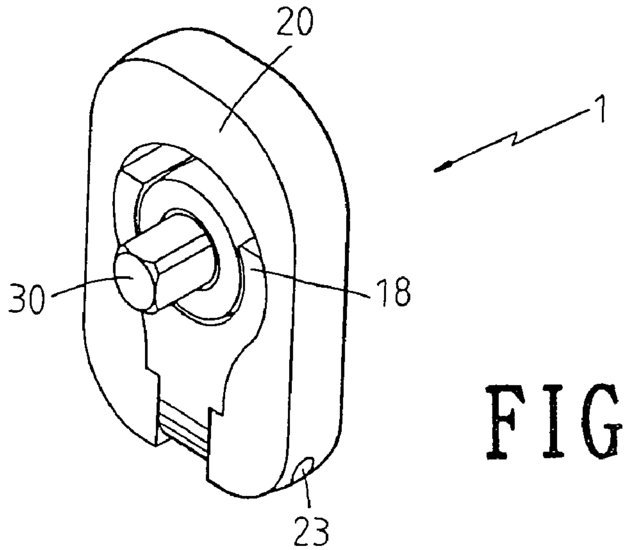
FIG. 6 is a perspective view showing that the palm type spanner of the present invention is at a folding state.
Figure 7A:
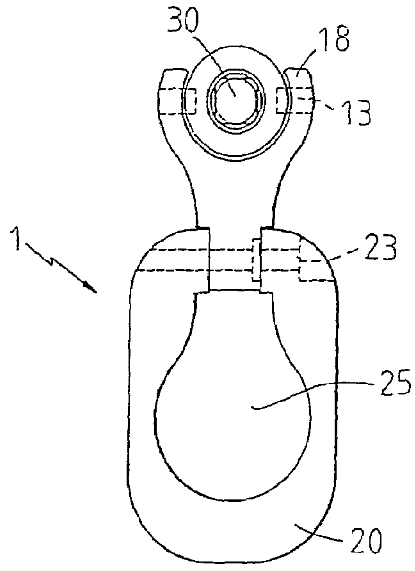
FIGS. 7*a* to 7*e* are perspective views and lateral views about the structure of the palm type spanner of the present invention.
Figure 7B:
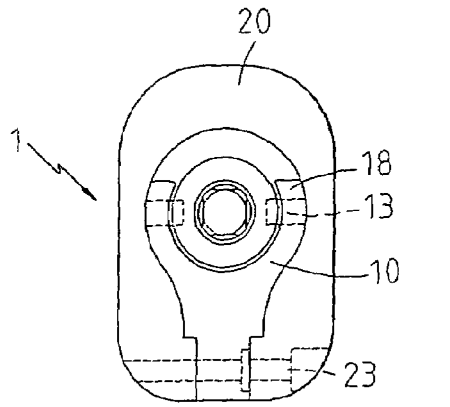
Figure 7C:
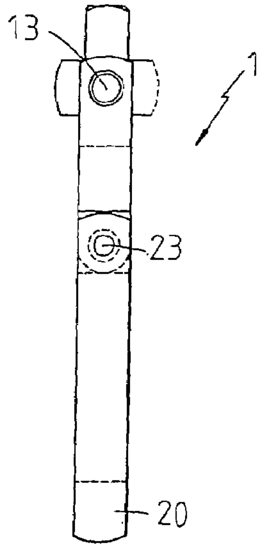
Figure 7D:
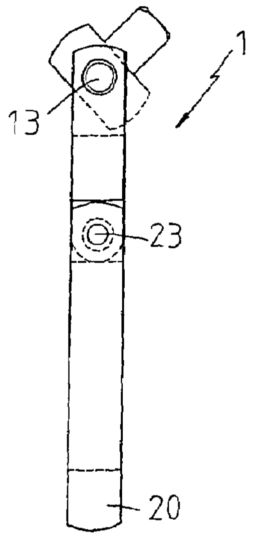
Figure 7E:
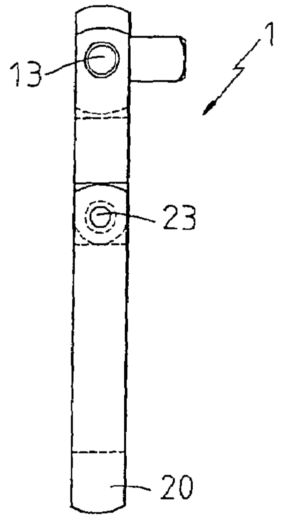
Figure 8A:
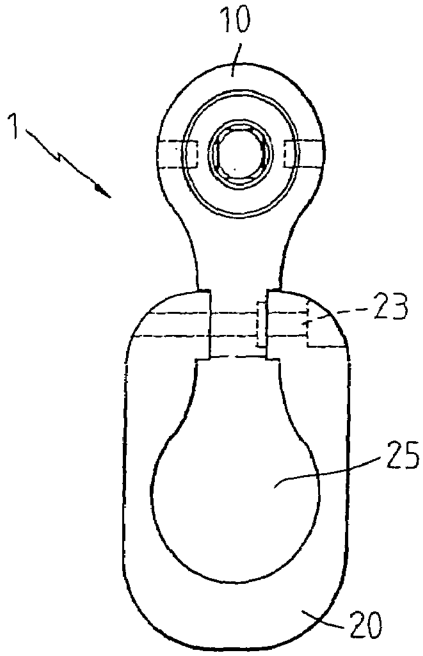
FIGS. 8*a* to 8*d* show the perspective view and lateral views of the palm type spanner of the present invention.
Figure 8B:
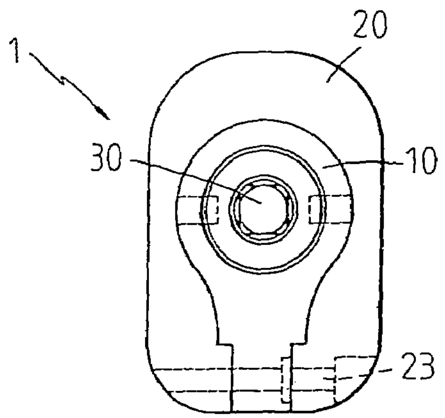
Figure 8C:
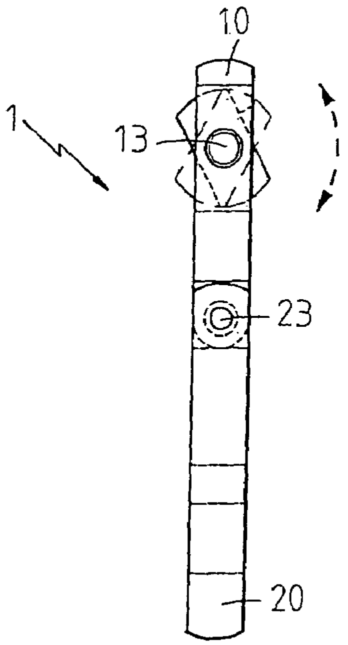
Figure 8D:
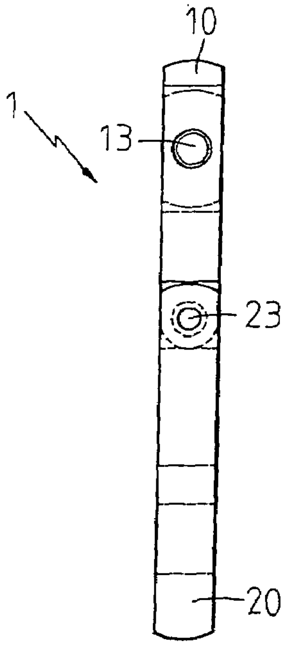
Figure 9A:
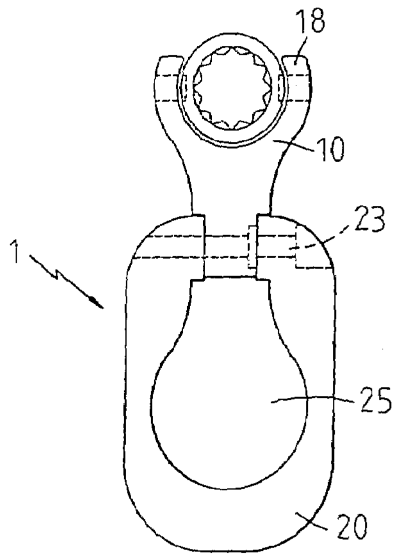
FIGS. 9*a* to 9*e* are perspective views and lateral views of the palm type spanner of the present invention.
Figure 9B:
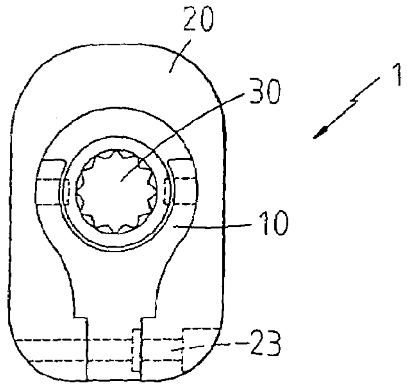
Figure 9C:
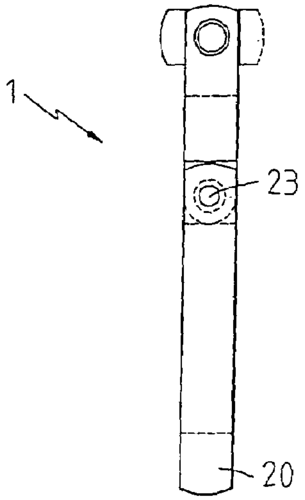
Figure 9D:
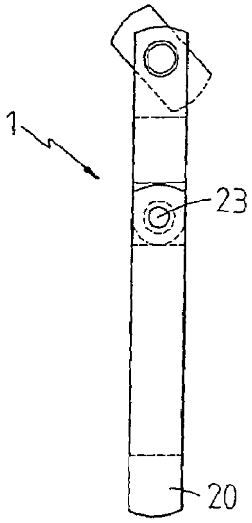
Figure 9E:
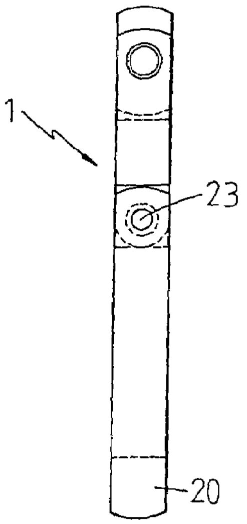
Figure 10:
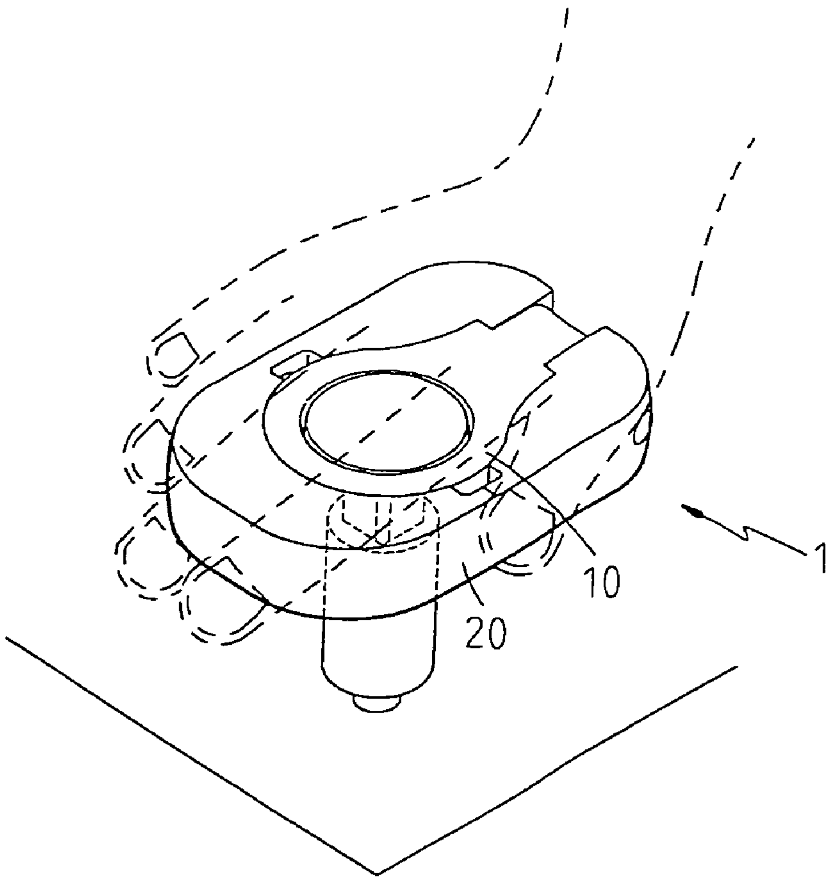
FIG. 10 is a perspective view about one application of the present invention.

In the present invention, when the driving head 10 is assembled to the driving tool 30, see FIGS. 2 and 5, the driving tool 30 is rotatable within a finite range (referring to FIGS. 4*c*, 7*c* to 7*e*, and 8*c* to 8*d* and 9*c* to 9*e*). The driving head 10 is assembled to the handle body 20 by a pivotal shaft 23 passing through the combining holes 22 of the handle body 20 and the recess 19 of the neck portion 17 of the driving head 10 (referring to FIGS. 4*a*, 4*b*, 7*a*, 7*b* and 8*a*, 8*b*, 9*a*, 9*b*). Referring to FIG. 10, when a short arm of force is necessary, the driving head 10 can be received in the groove 25. If a long arm of force is necessary, the driving head 10 is released from the groove 25 of the handle body 20 as shown in FIG. 11.

Figure 11:
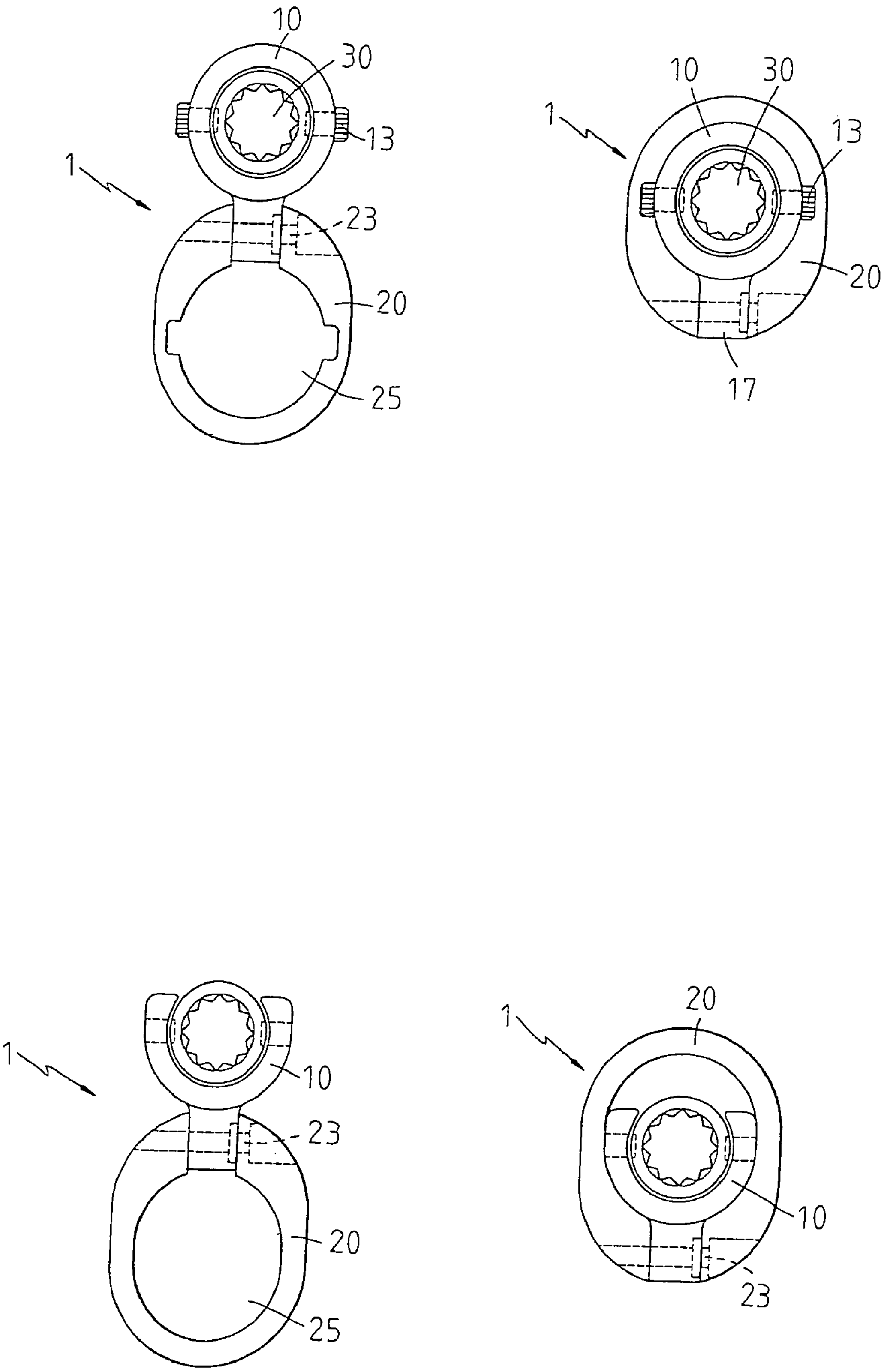
FIG. 11 is an assembled perspective view of the second embodiment of the present invention.

Referring to FIG. 11, in another embodiment of the present invention, the extension portion 15 of the driving head 10 is not used. The neck portion 17 is directly formed with the driving head 10. Thereby the size of the driving head 10, and thus the size of the palm type spanner of the present invention, becomes smaller.

Figure 12:
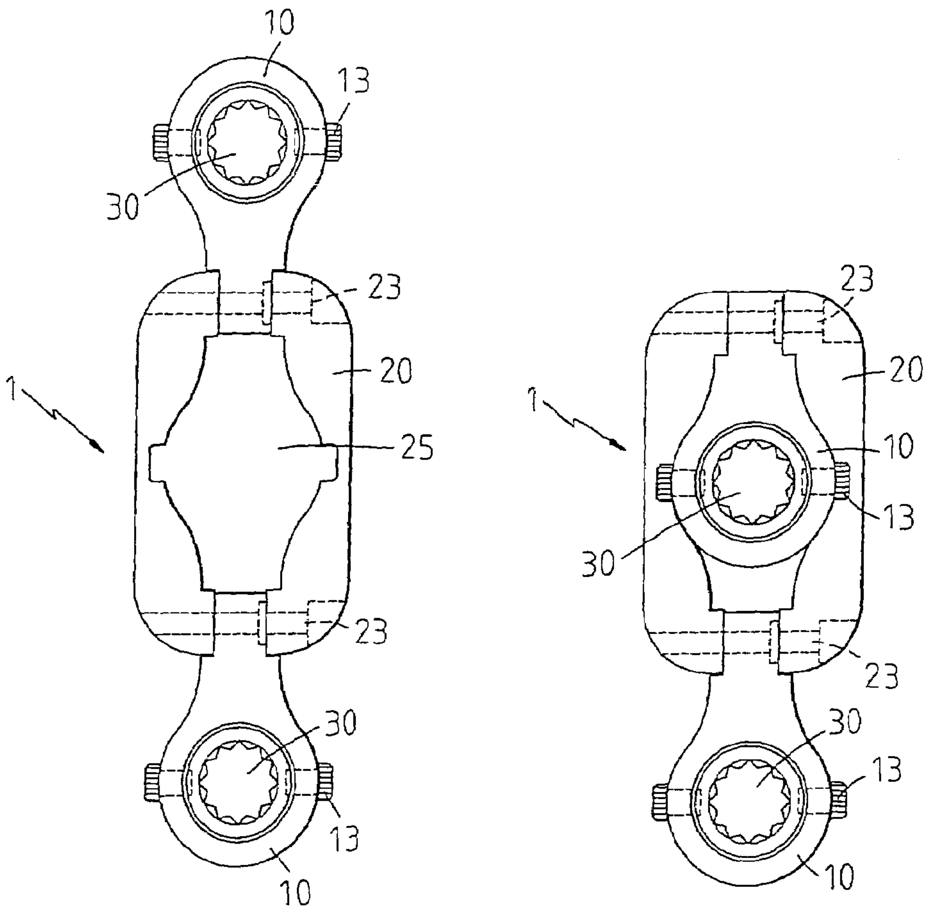
FIG. 12 is a perspective view about the third embodiment of the present invention.

Referring to FIG. 12, the second embodiment of the present invention is illustrated. Two sides of the handle body 20 are formed with respective opening portions 21. Each side of the handle body 20 is formed with a respective driving head 10 which is assembled to the handle body 20 at the opening portion 21.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A palm type spanner comprising:

a driving head having a receiving portion for receiving a driving tool; and a handle body being an integral plate-like structure: one end of the handle body being formed with an opening portion; the driving head being pivotally installed to the handle body; thereby the driving head being rotatable along a pivotal shaft installed at the opening portion of the handle body; the handle body having a hollowed groove which has a size capable of receiving the driving head;

wherein two lateral sides of the driving head aside the receiving portion being formed with retaining holes for retaining positioning elements.

2. The palm type spanner as claimed in claim 1, wherein a driving tool is installed to the driving head by using positioning elements to pass through the retaining holes of the driving head so as to be further inserted insert into the recesses the driving tools.

3. A palm type spanner comprising:

a driving head having a receiving portion for receiving a driving tool; and the receiving portion is a hole in the driving head;

a handle body being an integral plate-like structure; one end of the handle body being formed with an opening portion; the driving head being pivotally installed to the handle body; thereby the driving head being rotatable along a pivotal shaft; the handle body having a hollowed groove which has a size capable of receiving the driving head; and a driving tool installed to the driving head for driving an object to be driven by the palm type spanner; and wherein the driving tool is assembled into the receiving portion of the driving head; two sides of the driving tool have respective recesses corresponding to the retaining holes of the receiving portion; when the driving tool is assembled to the driving head, the positioning element passes through the retaining holes to insert into the recess so as to fix the driving tool.

* * * * *